United States Patent [19]
Sato et al.

[11] Patent Number: 5,802,017
[45] Date of Patent: Sep. 1, 1998

[54] INFORMATION-SIGNAL RECORDING APPARATUS AND RECORDING MODE INQUIRING/SPECIFYING METHOD

[75] Inventors: Makoto Sato; Harumi Kawamura, both of Tokyo, Japan

[73] Assignee: Sony Corporation, Tokyo, Japan

[21] Appl. No.: 738,616

[22] Filed: Oct. 29, 1996

[30] Foreign Application Priority Data

Nov. 2, 1995  [JP]  Japan ................. 7-310097

[51] Int. Cl.$^6$ ................................................. H04B 1/20
[52] U.S. Cl. ................................................. 369/2; 348/13
[58] Field of Search ................................ 369/1, 2, 3, 6; 455/344, 345; 348/13, 12, 10, 7–8; 360/72.2, 72.1

[56] References Cited

U.S. PATENT DOCUMENTS

| | | | |
|---|---|---|---|
| 5,195,065 | 3/1993 | Kato et al. | 369/2 |
| 5,508,733 | 4/1996 | Kassatly | 348/13 |

*Primary Examiner*—Ali Neyzari
*Attorney, Agent, or Firm*—Frommer Lawrence & Haug LLP; William S. Frommer

[57] ABSTRACT

To control the audio-recording mode of a video tape recorder used in a communication system, a plurality of pieces of equipment are connected to each other by communication-control buses for carrying out communication among them. Data "71h" set in an OPC (operation-code) field of a command specifying an audio-recording mode of a video tape recorder indicates an audio-recording mode. RM1 to RM4 sub-fields set in an OPR1 (operand) field indicate whether audio recording is to be carried out on Channels 1 to 4 respectively. SF1 to SF4 sub-fields of OPR2 and OPR3 fields indicate the sampling frequencies of Channels 1 to 4 respectively. NA1 to NA4 sub-fields of the OPR2 and OPR3 fields indicate whether one-channel audio recording, two-channel audio recording or 20 bit audio recording is to be carried out on Channels 1 to 4 respectively. Therefore, by transmitting a control signal conveying such a command, other equipment can specify the audio-recording mode of the VTR.

8 Claims, 8 Drawing Sheets

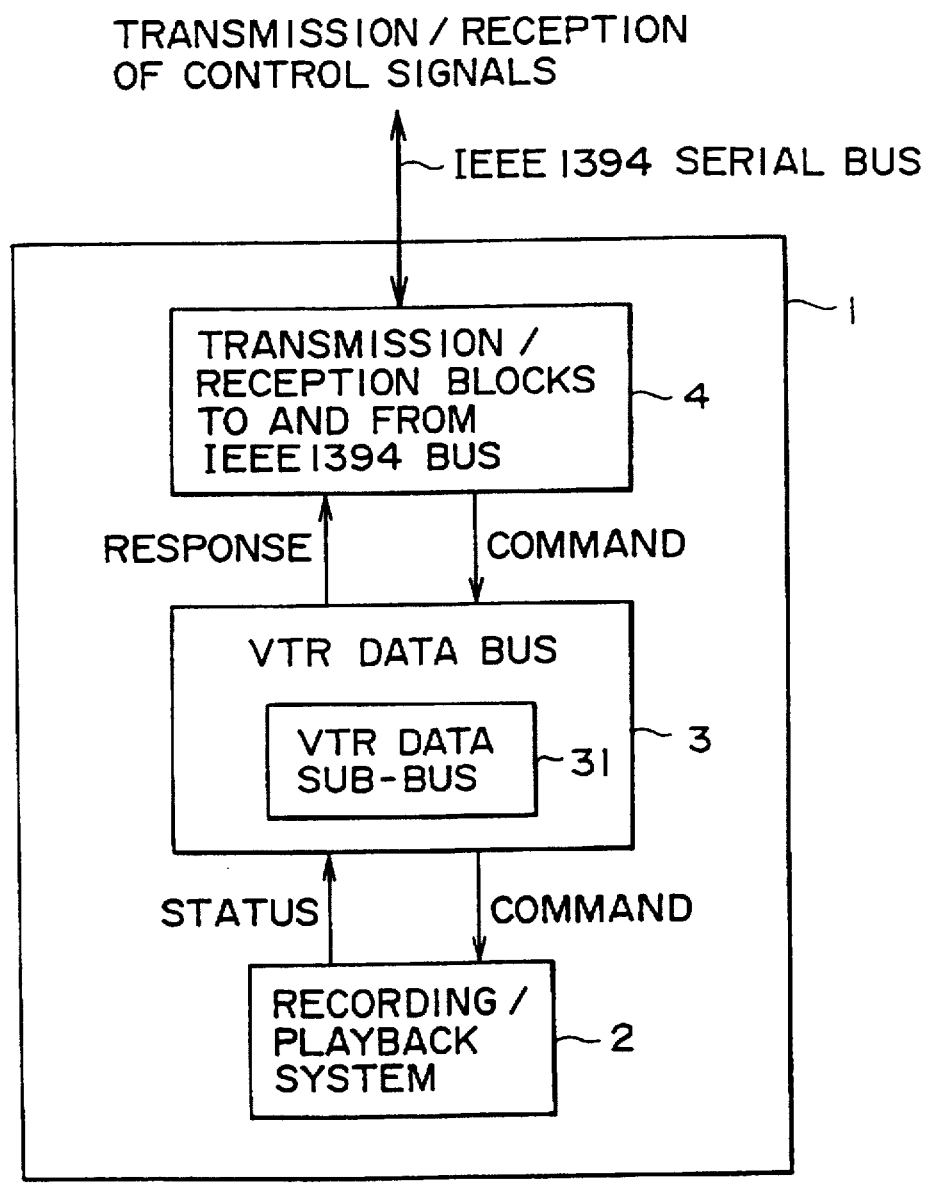

FIG. 2A FORMAT

| | CTS | CT/RC | HA | OPC | OPR1 | OPR2 | OPR3 |
|---|---|---|---|---|---|---|---|
| COMMAND FORMAT | "0"h | REQUEST TYPE | DESTINATION IN EQUIPMENT | COMMAND | PARAMETER 1 | PARAMETER 2 | PARAMETER 3 |
| RESPONSE FORMAT | "0"h | RESPONSE TYPE | SENDER IN EQUIPMENT | PROCESSED COMMAND | PARAMETER 1 | PARAMETER 2 | PARAMETER 3 |

FIG. 2B REQUEST IN AUDIO RECORDING MODE

| | | | | | | | |
|---|---|---|---|---|---|---|---|
| COMMAND TO VTR | "0"h | CONTROL COMMAND | VTR SUB-DEVICE | AUDIO RECORDING MODE | RECORDABLE/ UNRECORDABLE (CHANNELS 1 TO 4) | SAMPLING FREQUENCY (CHANNELS 1 AND 2) | SAMPLING FREQUENCY (CHANNELS 3 AND 4) |
| RESPONSE FROM VTR | "0"h | ACCEPT | VTR SUB-DEVICE | AUDIO RECORDING MODE | | | |

FIG. 2C INQUIRY IN AUDIO RECORDING MODE

| | | | | | | | |
|---|---|---|---|---|---|---|---|
| COMMAND TO VTR | "0"h | STATUS INQUIRY | VTR SUB-DEVICE | AUDIO RECORDING MODE | "FF"h | "FF"h | "FF"h |
| RESPONSE FROM VTR | "0"h | STABLE | VTR SUB-DEVICE | AUDIO RECORDING MODE | RECORDABLE/ UNRECORDABLE (CHANNELS 1 TO 4) | SAMPLING FREQUENCY (CHANNELS 1 AND 2) | SAMPLING FREQUENCY (CHANNELS 3 AND 4) |

COMMAND-SYNTAX DEFINITION

RMi

| | |
|---|---|
| 0 0 | RECORDING |
| 0 1 | NO RECORDING |
| 1 0 | (RESERVED) |
| 1 1 | DON'T CARE |

SFi

| | |
|---|---|
| 0 0 | 48 kHz |
| 0 1 | 44.1 kHz |
| 1 0 | 32 kHz |
| 1 1 | DON'T CARE |

NAi

| | |
|---|---|
| 0 0 | 1CH |
| 0 1 | 2CH |
| 1 0 | 20BIT AUDIO MODE |
| 1 1 | DON'T CARE |

16 TO 19 ··· IEEE 1394 SERIAL BUSES

CSP : CYCLE START PACKET
Iso : Iso COMMUNICATION PACKET
Async : ASYNCHRONOUS COMMUNICATION PACKET

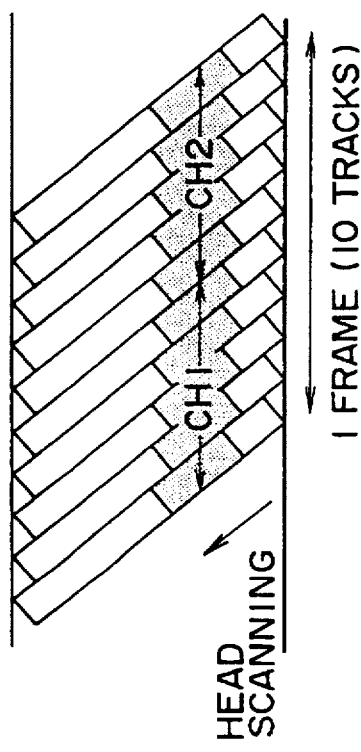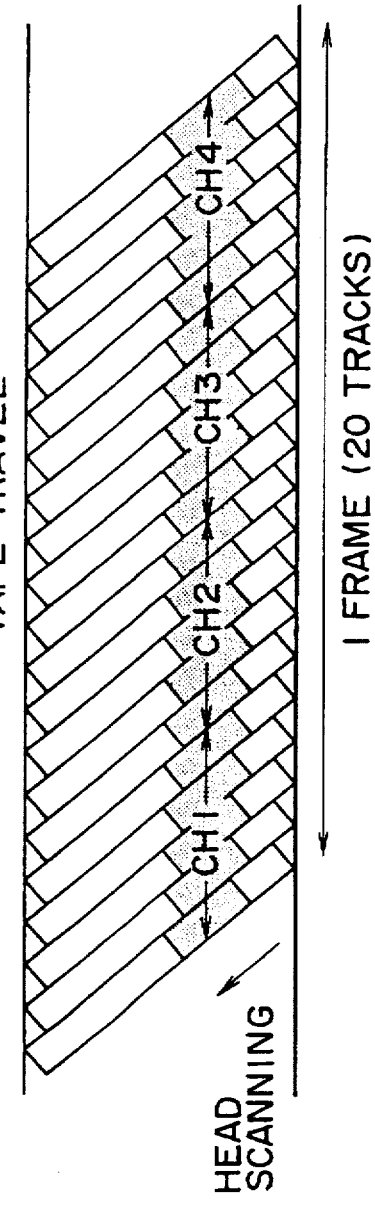

FIG. 9A (RELATED ART) 525-60 SYSTEM (SD FORMAT)

|  | CH1 | CH2 |
|---|---|---|
| SD-2CH MODE (48K) | 48K | 48K |
| SD-2CH MODE (44.1K) | 44.1K | 44.1K |
| SD-2CH MODE (32K) | 32K | 32K |
| SD-4CH MODE | 32K+2CH | 32K+2CH |

FIG. 9B (RELATED ART) 1125-60 SYSTEM (HD FORMAT)

|  | CH1 | CH2 | CH3 | CH4 |
|---|---|---|---|---|
| HD-4CH MODE (48K) | 48K | 48K | 48K | 48K |
| HD-4CH MODE (44.1K) | 44.1K | 44.1K | 44.1K | 44.1K |
| HD-4CH MODE (32K) | 32K | 32K | 32K | 32K |
| HD-6CH MODE | 48K | 48K | 32K+2CH | 32K+2CH |
| HD-8CH MODE | 32K+2CH | 32K+2CH | 32K+2CH | 32K+2CH |
| HD-20BIT MODE | 16BIT | 16BIT | 32K | 4BIT+4BIT |

5,802,017

1

INFORMATION-SIGNAL RECORDING APPARATUS AND RECORDING MODE INQUIRING/SPECIFYING METHOD

BACKGROUND OF THE INVENTION

1. Field of the Invention

The present invention relates to a system for carrying out communication among a plurality of pieces of electronic equipment connected to each other by communication control buses capable of transmitting control and information signals mixed with each other such as a serial bus conforming to IEEE-1394. Such a bus is referred to hereafter as an IEEE1394 bus. To be more specific, the present invention relates to a technology for controlling an audio recording mode of a predetermined information signal in an information-signal recording apparatus of the system from other pieces of equipment in the system.

2. Description of Related Art

It is possible to contrive a system for communicating information and control signals among a plurality of pieces of electronic equipment connected to each other by communication control buses capable of transmitting the control and information signals mixed with each other such as the IEEE1394 serial buses.

An example of such a system is shown in FIG. 5. As shown in the figure, the system comprises a hard disk drive 11, a personal computer (referred to hereafter merely as a PC) 12, a television receiver (referred to hereafter merely as a TV) 13, a video tape recorder (referred to hereafter merely as a VTR) 14 and a CD player 15. IEEE1394 serial buses 16 and 17 are used for connecting the hard disk derive 11 to the PC 12 and the PC 12 to the VTR 14 respectively whereas IEEE1394 serial buses 18 and 19 are used for connecting the VTR 14 to the TV 13 and the VTR 14 to the CD player 15 respectively. Notations #A to #E are system node IDs of the hard disk drive 11, the PC 12, the TV 13, the VTR 14 and the CD player 15 respectively.

As shown in FIG. 6, transmission of signals among the pieces of electronic equipment (referred to hereafter merely as equipment) in the system is carried out on a time-multiplexing basis in predetermined communication cycles which each has a period of typically 125 microseconds. The transmission of signals by way of a bus is started by a piece of electronic equipment called a cycle master. The cycle master starts the transmission of signals by outputting a cycle start packet indicating the start of a communication cycle.

There are two types of communication carried out in a communication cycle. The first one is isochronous communication used for transmitting an information signal such as video and audio data while the second one is asynchronous communication used for transmitting a control signal such as a connection control command. The isochronous and asynchronous communications are referred to hereafter merely as Iso and Async communications respectively. Iso-communication packets are transmitted before Async-communication packets. By appending channel numbers 1, 2, 3, . . . N to Iso-communication packets, a plurality of pieces of Iso data can be distinguished from each other. When the transmission of Iso-communication packets is ended, Async-communication packets are transmitted over the remaining period of time up to the next cycle start packet.

In the Async communication, a control signal output by a piece of equipment to request another piece of equipment to perform some work is called a command. The equipment transmitting a command by including it in a packet is called a controller whereas the equipment receiving the command is known as a target. If necessary, the target returns a packet including a control signal showing an execution result of the command to the controller. The control signal showing an execution result of the command is called a response.

The command and response are communicated between a controller and a target. A series of command and response exchanges started by a command and ended by a response is called a command transaction. The target is determined to return a response as early as possible, typically in 100 ms after a command is received. By such an early response, processing can be prevented from being prolonged by the controller long idle time waiting for a response and prevented from being halted due to a response not received because of some failures.

The controller requests the target to carry out a specific operation or makes an inquiry about the present status of the target through a command transaction. Any equipment in the system can start and end a command transaction. That is to say, any equipment in the system can serve as a controller or a target.

The structure of an Async communication packet including a control signal is shown in FIG. 7. Both a command and a response have the same structure. Pieces of data in the packet shown in the figure are transmitted one after another from the top to the bottom and from the left to the right.

As shown in the figure, the packet comprises a packet header and a data block. The entire packet header and a data CRC in the data block, that is, the dotted portions shown in the figure conform to the standards of IEEE 1394. The contents of the data block are transferred from equipment identified by a source ID in the packet header to an address shown as a destination offset of equipment identified by a destination ID.

When a command is transmitted from the PC 12 to the VTR 14 shown in FIG. 5, for example, the source ID is #B and the destination ID is #D. The destination offset is the address of a memory space allocated as an area in the VTR 14 for storing a command.

A CTS (command transaction sub-set) in the data block shown in FIG. 7 indicates the type of a command language. A CT/RC (command type/response code) indicates the type of a request in the case of a command or the type of a response to a request in the case of a response. In the case of a command, an HA (header address) indicates whether the requested target is the entire piece of equipment or a sub-device (or a functional unit) in the piece of equipment. In the case of a response, on the other hand, the HA indicates the target returning a response, the same target as that indicated in the HA of the command. An OPC (operation code) or a command code describes the request and an OPR (operand) following the OPC is a parameter necessary for the request.

A VTR in which video and audio data is recorded and played back into and from a magnetic tape by means a rotary magnetic head has been proposed. An audio recording format in such a VTR is shown in FIG. 8. The upper diagram in the figure shows an SD (standard) format whereas the lower diagram is an HD (high definition) format. Audio recording modes of audio data are shown in FIG. 9. The upper and lower tables in the figure show audio recording modes for the SD and HD formats respectively. It should be noted that, in each track of the SD and HD formats shown in FIG. 8, video data and sub-code data are recorded in areas outside a recording area of audio data indicated by a dotted portion in the figure. Since the present invention relates to recording of audio data, only matters related to audio data are thought of.

As shown in FIG. 8A, in the SD format, 1 frame of video data of a television signal with a field frequency of 60 Hz and a line count of 525 is recorded by splitting it into 10 tracks. On the other hand, since audio data recorded in 5 tracks is data of 1 frame, 10 tracks can be used for recording audio data of two systems. The two systems are distinguished from each other by calling them Channels 1 and 2 respectively.

In an SD-2CH mode shown in FIG. 9A, L (left) and R (right) audio signals of a stereo system for Channels 1 and 2 can be recorded by setting the sampling frequency at 48 kHz, 44.1 kHz or 32 kHz. In an SD-4CH mode, on the other hand, each channel is further divided into two systems, allowing audio signals of a total of four systems to be recorded.

By the same token, as shown in FIG. 8B, in the HD format, 1 frame of video data of a television signal with a field frequency of 60 Hz and a line count of 1,125 is recorded by splitting it into 20 tracks. With 20 tracks, audio data of four channels can be recorded. As shown in FIG. 9B, there are six audio recording modes of audio data. It should be noted that, in an HD-20 bit mode, Channels 1 and 2 of 16 bits each and two systems of Channel 4 of 4 bits each form two systems of 20 bits each. The 20 bits are sampled at a frequency of 32 kHz.

SUMMARY OF THE INVENTION

It is an object of the present invention to control the audio recording mode of a VTR with a configuration described above when used in a communication system as a piece of equipment from other pieces of equipment in the communication system.

In order to achieve the object described above, the present invention provides an information-signal recording apparatus employed in a system for communicating information signals and control signals among a plurality of pieces of electronic equipment connected to each other to compose the system by communication control buses capable of mixing the control signals and the information signals, the information-signal recording apparatus comprising: first means for recording an information signal; second means for controlling operations of the first means and monitoring status of the first means; and third means for transmitting responses and receiving commands to and from the communication control buses, wherein a response indicating an audio recording mode is returned to other electronic equipment employed in the system in response to an inquiry command inquiring an audio recording mode from the other equipment and an audio recording mode is set in accordance with a recording mode specifying command received from other electronic equipment employed in the system.

In addition, the present invention also provides a recording mode inquiring/specifying method adopted in a system for communicating information signals and control signals among a plurality of pieces of electronic equipment connected to each other to compose the system by communication control buses capable of mixing the control signals and the information signals, whereby an information-signal recording apparatus employed in the system as a piece of electronic equipment returns a response indicating an audio recording mode thereof to other electronic equipment employed in the system in response to an inquiry command inquiring an audio recording mode from the other equipment and the information-signal recording apparatus sets an audio recording mode thereof in accordance with a recording mode specifying command received from other electronic equipment employed in the system.

It is thus desirable to make a recording mode specifying command and an operation mode specifying command independent of each other. Audio recording modes can be indicated by using codes for expressing all audio recording modes which are available for a number of recording formats having a variety of types.

In the present invention, the information signal is typically an audio signal. In addition, in the specification of an audio recording mode in an information-signal recording apparatus requested by electronic equipment, the information-signal recording apparatus can arbitrarily modify some parameters used for characterizing the audio recording mode such as the sampling frequency and the number of channels. It should be noted that, by an information-signal recording apparatus, an apparatus that has at least a function for recording an information signal is meant. Thus, an apparatus having a function for recording and playing back an information signal is also an information-signal recording apparatus.

BRIEF DESCRIPTION OF THE DRAWINGS

FIG. 1 is a diagram showing a unit of a VTR provided by the present invention for exchanging commands, responses and the like;

FIGS. 2A to 2C are diagrams showing the structures of general formats of a command and a response;

FIGS. 8A and 8B are diagrams showing typical audio-recording formats used in a VTR; and FIGS. 9A and 9B are tables showing typical audio-recording modes adopted in a VTR.

DETAILED DESCRIPTION OF THE PREFERRED EMBODIMENTS

Figures 3A, 3B, 3C, 3D:
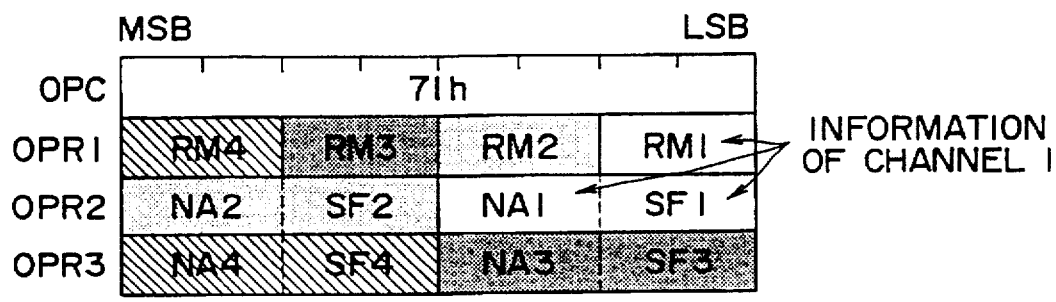
FIGS. 3A to 3D are diagrams showing details of pieces of information set in OPC and OPR fields of the command and response shown in FIGS. 2A to 2C.

The present invention will become apparent from the following detailed description of some preferred embodiments with reference to accompanying diagrams showing the embodiments.

FIG. 1 is a diagram showing the configuration of a unit employed in a VTR provided by the present invention for exchanging commands and responses.

As shown in the figure, the VTR 1 comprises a recording/playback system 2, a VTR device 3 and an IEEE1394-bus transmitting/receiving block 4. The recording/playback system 2 comprises circuits and a mechanical system for recording and playing back audio and video data in the formats described previously. The VTR device 3 is a microcomputer including a VTR sub-device 31 for processing commands for the recording/playback system 2 by executing software. It should be noted that, an actual VTR includes units such as a tuner and a timer in addition to the recording/playback system 2 as well as a sub-device for processing commands for the units. Since the units and the sub-device are not required in the explanation of the present embodiment, however, their description is omitted.

The IEEE1394-bus transmitting/receiving block 4 detects an Async-communication packet received by way of an IEEE1394 serial bus and then transmits a command included in the packet to the VTR device 3. If the HA field of the command indicates the VTR sub-device 31, the VTR device 3 passes on the command to the sub-device 31. In turn, the VTR sub-device 31 carries out processing to control the recording/playback system 2 in accordance with the command received from the VTR device 3. In addition, the VTR device 31 monitors various kinds of status such as a mechanical mode and a time code of the recording/playback system 2 and creates a response if necessary. The response is returned to the IEEE1394-bus transmitting/receiving block 4 by the VTR device 3. The IEEE1394-bus transmitting/receiving block 4 puts the response in an Async-communication packet and sends the packet to the IEEE1394 serial bus.

FIG. 2 is a diagram showing the structures of general formats of a command and a response, the structures of a command for specifying an audio-recording mode to the VTR and its response and examples of a command for making an inquiry about the audio-recording mode and its response.

As shown in the figure, the CTS field is set to 0h(zero). A string control Commandset in the CT/RC field indicates a request while a string status Inquiry indicates an inquiry. A string accept is a response acknowledging the request control Command and a string table is a response to the inquiry status Inquiry. The HA field indicates the VTR sub-device described above. The OPC field describes details of a command regarding the audio-recording mode. The OPR1 field indicates whether or not audio recording is to be carried out on Channels 1 to 4. The OPR2 field indicates the sampling frequencies of Channels 1 and 2 whereas the OPR3 field indicates the sampling frequencies of Channels 3 and 4. Details will be described later. The OPR1 to OPR3 fields of the response accept contain the same pieces of information as the command with no changes. The contents of the OPR1 to OPR3 fields of the command status Inquiry each contains Fh.

FIG. 3 shows details of pieces of information set in the OPC and OPR1 to OPR3 fields. A diagram (1) of the figure shows the definition of the command syntax. The audio-recording mode is indicated by 1h set in the OPC field. RM1 to RM4 sub-fields set in the OPR1 field indicate whether audio recording is to be carried out on Channels 1 to 4 respectively. The contents of each of the RM1 to RM4 sub-fields are shown in a diagram (2). SF1 to SF4 sub-fields of the OPR2 and OPR3 fields indicate the sampling frequencies of Channels 1 to 4 respectively. The contents of each of the SF1 to SF4 sub-fields are shown in a diagram (3). NA1 to NA4 sub-fields of the OPR2 and OPR3 fields indicate whether one-channel audio recording or two-channel audio recording is to be carried out on Channels 1 to 4 respectively. The contents of each of the NA1 to NA4 sub-fields are shown in a diagram (4). It should be noted, however, that the NA1 to NA4 fields are all set to 0. A string on Care in a field means that the VTR receiving the command can set the field freely.

The OPR1 to OPR3 fields are explained through examples. For RM2=0, audio recording is carried out on Channel 2. In this case, for NA2=01 and SF2=10, the sampling frequency of an audio signal to be recorded on Channel 2 is 32 kHz and two-channel audio recording is to be carried out.

Possible combinations of the OPR2 and OPR3 fields shown in FIG. 3 cover all the audio-recording modes shown in FIG. 8. As a matter of fact, some of the combinations are not used. Accordingly, if a new audio-recording mode is adopted in the future, it is not necessary to create a new command for it. On the top of that, if the number of channels increases, the additional channels can be handled by adding OPR fields.

Figure 4:
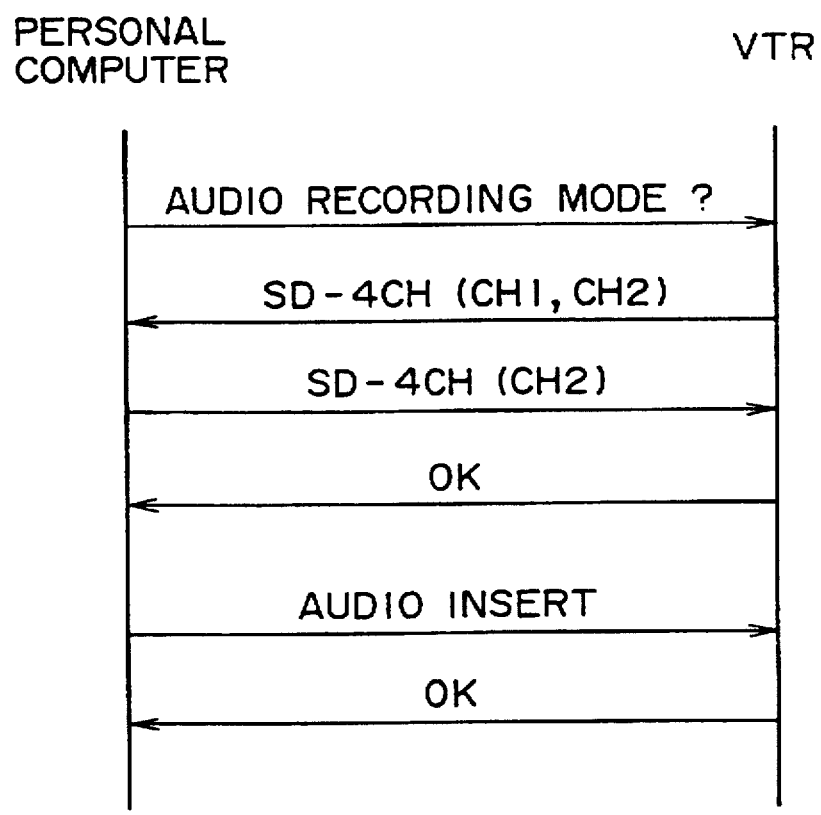
FIG. 4 is a diagram showing a procedure followed to accompany an after-record command issued to a VTR for Channel 2 in which audio data has been recorded.
Figure 5:
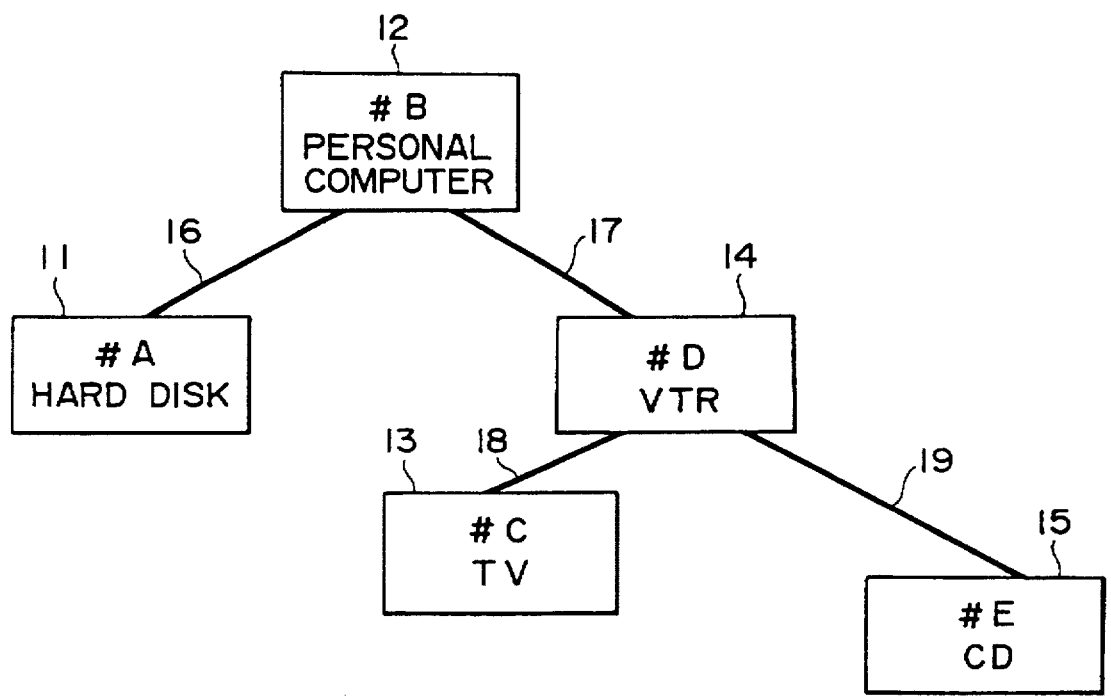
FIG. 5 is a diagram showing a typical communication system using an IEEE1394 serial bus.
Figure 6:
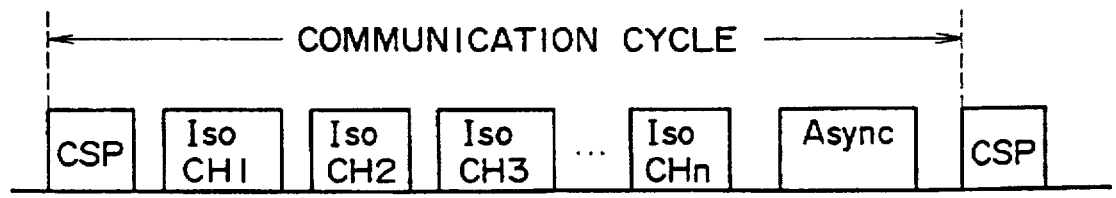
FIG. 6 is a diagram showing a typical data structure on a bus of a communication system using an IEEE1394 serial bus.
Figure 7:
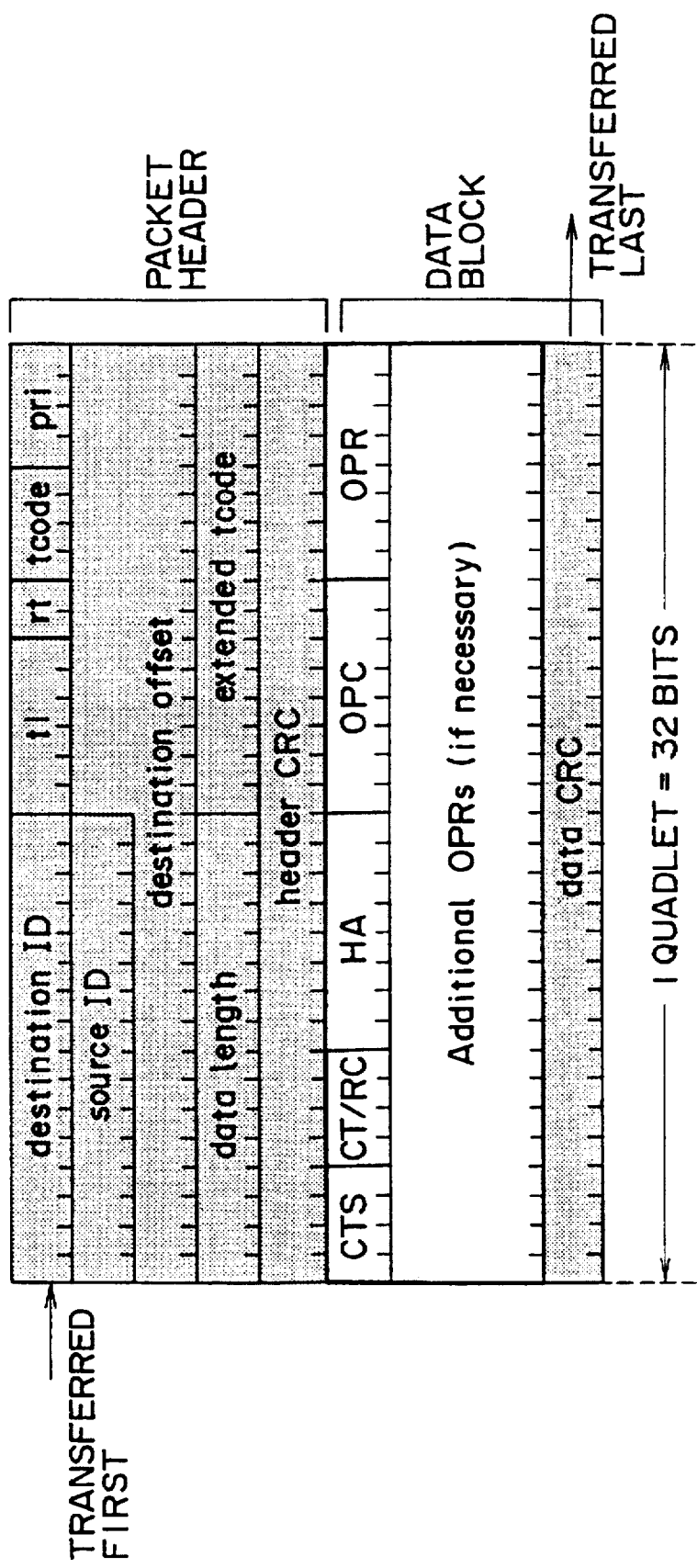
FIG. 7 is a diagram showing the structure of an Async-communication packet including a control signal.

Next, a procedure followed to accompany an after-record command issued by the PC 12 shown in FIG. 5 to the VTR 14 for Channel 2 in which audio data has been recorded in an SD-four-channel mode is explained by referring to FIG. 4. It should be noted that the source of the audio signal to be after-recorded is predetermined equipment in the system such as the CD player 15. As an alternative, a microphone connected to the VTR 14 can be used as a source of the audio signal to undergo an after-record operation.

First of all, the PC transmits an inquiry command about the audio mode shown in FIG. 2C to the VTR. Receiving the inquiry command, the VTR set pieces of information in the OPR fields indicating the audio-recording mode and returns a response with a format shown in FIG. 2C. If the audio-recording mode of the VTR is set to SD four channels as shown in FIG. 4, pieces of data 1010000 and 1100110 are set in the OPR1 and OPR2 fields respectively. In an SD mode, the OPR3 is not used and, thus, data Fh is set therein.

Receiving this response from the VTR, the PC sets pieces of data 1010001 and 1101111 in the OPR1 and OPR2 fields respectively of the command shown in FIG. 2B in order to request that data be recorded in Channel 2 only. Acknowledging this command, the VTR returns a response shown in FIG. 2B with the OPR fields remaining as they are.

Next, the PC transmits a command requesting the VTR to carry out an audio-insert operation. In the OPC field of the command shown in the diagram (2) of FIG. 2, information requesting an audio-insert operation is set. Receiving and acknowledging this command, the VTR returns a response with the string accept set in the CT/RC thereof.

As described above, according to the present embodiment, commands for specifying an audio-recording mode of an audio signal are made independent of commands specifying an operation mode of the VTR. In this example, the command specifying an operation mode of the VTR is a command requesting an audio-insert operation.

As has been described above in detail, audio-recording modes can be indicated by using codes for expressing all audio-recording modes which are available for a number of recording formats having a variety of types of the information-signal recording apparatus. As a result, it is possible to respond to an inquiry issued by other equipment and to set an audio-recording mode in accordance with a command issued by other equipment.

In addition, commands for specifying an audio-recording mode of an audio signal are made independent of commands specifying an operation mode of the VTR as described above. On the top of that, the values of parameters used for characterizing the audio-recording mode can be arbitrarily selected.

What is claimed is:

1. An information-signal recording apparatus employed in a system for communicating information signals and control signals among a plurality of pieces of electronic equipment connected to each other to compose said system by communication-control buses capable of mixing said control signals and said information signals, said information-signal recording apparatus comprising:

first means for recording an information signal;

second means for controlling operations of said first means and monitoring the status of said first means; and third means for transmitting responses and receiving commands to and from said communication-control buses, wherein said third means transmits along said communication control buses a response indicating an audio-recording mode to other electronic equipment employed in said system in response to an inquiry command transmitted along said communication control buses from said other equipment inquiring said status of said first means, and said second means sets an audio-recording mode of said first means to record audio information in accordance with a recording-mode specifying command received by said information-signal recording apparatus from other electronic equipment employed in said system.

2. A recording-mode inquiring/specifying method adopted in a system for communicating information signals and control signals among a plurality of pieces of electronic equipment connected to each to other compose said system by communication-control buses capable of mixing said control signals and said information signals, comprising the steps of:

returning a response from an information-signal recorder employed in said system as a piece of electronic equipment indicating an audio-recording mode thereof to other electronic equipment employed in said system in response to an inquiry command inquiring an audio-recording mode from said other equipment; and setting an audio-recording mode of said information-signal recording apparatus in accordance with a recording-mode specifying command received from other electronic equipment employed in said system.

3. A recording-mode inquiring/specifying method according to claim 2 wherein a recording-mode specifying command directing said information-signal recorder to enter a recording-mode is transmitted ever said communication-control buses from said other electronic equipment independently from an operation-mode setting command transmitted over said communication-control buses from said other electronic equipment requesting the audio-recording mode said information-signal recorder.

4. A recording-mode inquiring/specifying method according to claim 2, wherein said information signal is an audio signal and said information-signal recorder is a video tape recorder.

5. A recording-mode inquiring/specifying method according to claim 2, wherein said signal-information recorder can arbitrarily select an item used for characterizing an audio-recording mode of said information signal.

6. An information-signal recording apparatus according to claim 1, wherein said information signals are audio signals and said information-signal recording apparatus is a video tape recorder.

7. An information-signal recording apparatus according to claim 6, wherein at least one of said other electronic equipment is a personal computer.

8. A recording-mode inquiring/specifying method according to claim 4, wherein at least one of said other electronic equipment is a personal computer.

* * * * *